(12) United States Patent
Saito

(10) Patent No.: US 11,283,628 B2
(45) Date of Patent: Mar. 22, 2022

(54) INFORMATION PROCESSING DEVICE THAT PROCESSES INFORMATION USING PRIVATE KEY AND PUBLIC KEY

(71) Applicant: Brother Kogyo Kabushiki Kaisha, Aichi (JP)

(72) Inventor: Ken Saito, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 675 days.

(21) Appl. No.: 15/937,226

(22) Filed: Mar. 27, 2018

(65) Prior Publication Data

US 2019/0081801 A1 Mar. 14, 2019

(30) Foreign Application Priority Data

Sep. 11, 2017 (JP) .............................. JP2017-174072

(51) Int. Cl.
*H04L 9/32* (2006.01)
*H04L 9/14* (2006.01)

(52) U.S. Cl.
CPC .............. *H04L 9/3268* (2013.01); *H04L 9/14* (2013.01); *H04L 9/3247* (2013.01)

(58) Field of Classification Search
CPC ........ H04L 9/3268; H04L 9/14; H04L 9/3247
See application file for complete search history.

(56) References Cited

U.S. PATENT DOCUMENTS

| 7,114,070 B1 * | 9/2006 | Willming .......... H04L 29/12273 380/30 |
| 2006/0168357 A1 | 7/2006 | Nakano et al. |
| 2007/0174618 A1 | 7/2007 | Nakano et al. |
| 2013/0287210 A1 | 10/2013 | Matsuda et al. |

(Continued)

FOREIGN PATENT DOCUMENTS

| JP | 2002-215827 A | 8/2002 |
| JP | 2002-542545 A | 12/2002 |

(Continued)

OTHER PUBLICATIONS

Feb. 24, 2021—(JP) Notice of Reasons for Refusal—App 2017-174072, Eng Tran.

*Primary Examiner* — Linglan E Edwards
*Assistant Examiner* — Forrest L Carey
(74) *Attorney, Agent, or Firm* — Banner & Witcoff, Ltd.

(57) ABSTRACT

An information processing device includes: a non-volatile storage; a communication interface; a processor; and a memory. The non-volatile storage is configured to store a private key. The memory stores computer-readable instructions therein. The computer-readable instructions, when executed by the processor, cause the information processing device to perform: acquiring the private key from the non-volatile storage; acquiring a certificate from a specific external device via the communication interface, the certificate including a public key corresponding to the private key, and the specific external device being different from the information processing device; converting specific data (Continued)

using the private key to generate converted specific data, the converting including one of encrypting the specific data and decrypting the specific data encrypted using the public key; and outputting the certificate.

16 Claims, 6 Drawing Sheets

(56) References Cited

U.S. PATENT DOCUMENTS

| | | | |
|---|---|---|---|
| 2014/0032913 A1* | 1/2014 | Tenenboym | H04L 9/321 |
| | | | 713/176 |
| 2014/0181504 A1* | 6/2014 | Almahallawy | H04L 63/0823 |
| | | | 713/156 |
| 2016/0352527 A1 | 12/2016 | Satoh | |
| 2017/0063550 A1* | 3/2017 | Brodie | H04L 9/3247 |
| 2018/0167812 A1* | 6/2018 | Nagarajamoorthy | |
| | | | H04W 12/66 |

FOREIGN PATENT DOCUMENTS

| | | |
|---|---|---|
| JP | 2005-045785 A | 2/2005 |
| JP | 2005-268931 A | 9/2005 |
| JP | 2006-101218 A | 4/2006 |
| JP | 2016-224604 A | 12/2016 |
| WO | 00-63854 A1 | 10/2000 |
| WO | 2012/095973 A1 | 7/2012 |

* cited by examiner

INFORMATION PROCESSING DEVICE THAT PROCESSES INFORMATION USING PRIVATE KEY AND PUBLIC KEY

CROSS REFERENCE TO RELATED APPLICATION

This application claims priority from Japanese Patent Application No. 2017-174072 filed Sep. 11, 2017. The entire content of the priority application is incorporated herein by reference.

TECHNICAL FIELD

The present disclosure relates to an information processing device that processes information using a private key and a public key, and a computer program for implementing this process.

BACKGROUND

Processes that employ a private key and a public key are well known in the art. For example, a technique known in the art utilizes a private key and a public key for publishing and inspecting a document with an electronic signature for use in electronic commerce (e-commerce).

SUMMARY

However, when information that includes a private key and a public key must be stored for each user, for example, the device used to store this information may require a large capacity non-volatile storage.

In view of the foregoing, it is an object of the present disclosure to provide a technology capable of reducing the required capacity of the non-volatile storage for processes utilizing a private key and a public key without compromising security.

In order to attain the above and other objects, the present disclosure provides an information processing device that includes: a non-volatile storage; a communication interface; a processor; and a memory. The non-volatile storage is configured to store a private key. The processor includes hardware. The memory stores computer-readable instructions. The computer-readable instructions, when executed by the processor, causes the information processing device to perform: acquiring the private key from the non-volatile storage; acquiring a certificate from a specific external device via the communication interface, the certificate including a public key corresponding to the private key, the specific external device being different from the information processing device; converting specific data using the private key to generate converted specific data, the converting including one of encrypting the specific data and decrypting the specific data encrypted using the public key; and outputting the certificate.

According to another aspect, the present disclosure provides a non-transitory computer readable storage medium storing a set of program instructions. The set of program instructions is installed on and executed by a processor for controlling an information processing device. The information processing device includes: a non-volatile storage; a communication interface; and the processor. The non-volatile storage is configured to store a private key. The set of program instructions includes: acquiring the private key from the non-volatile storage; acquiring a certificate from a specific external device via the communication interface, the certificate including a public key corresponding to the private key, the specific external device being different from the information processing device; converting specific data using the private key to generate converted specific data, the converting including one of encrypting the specific data and decrypting the specific data encrypted using the public key; and outputting the certificate.

According to still another aspect, the present disclosure provides a method for controlling an information processing device. The information processing device includes: a non-volatile storage; and a communication interface. The non-volatile storage is configured to store a private key. The method includes: acquiring the private key from the non-volatile storage; acquiring a certificate from a specific external device via the communication interface, the certificate including a public key corresponding to the private key, the specific external device being different from the information processing device; converting specific data using the private key to generate converted specific data, the converting including one of encrypting the specific data and decrypting the specific data encrypted using the public key; and outputting the certificate.

BRIEF DESCRIPTION OF THE DRAWINGS

The particular features and advantages of the disclosure as well as other objects will become apparent from the following description taken in connection with the accompanying drawings, in which:

FIGS. 2A through 2D are explanatory diagrams illustrating various types of information stored in the MFP and server, in which FIG. 2A is a conceptual diagram of a key storage area of the MFP, FIG. 2B is a conceptual diagram of a certificate storage area of the server, FIG. 2C is a conceptual diagram of key management information including a management table and certificate destination information, and FIG. 2D illustrates an example of a signed PDF file generated by the MFP;

DETAILED DESCRIPTION

Next, embodiments of the present disclosure will be described while referring to the accompanying drawings.

A. First Embodiment

A-1: Structure of System 1000

Figure 1:
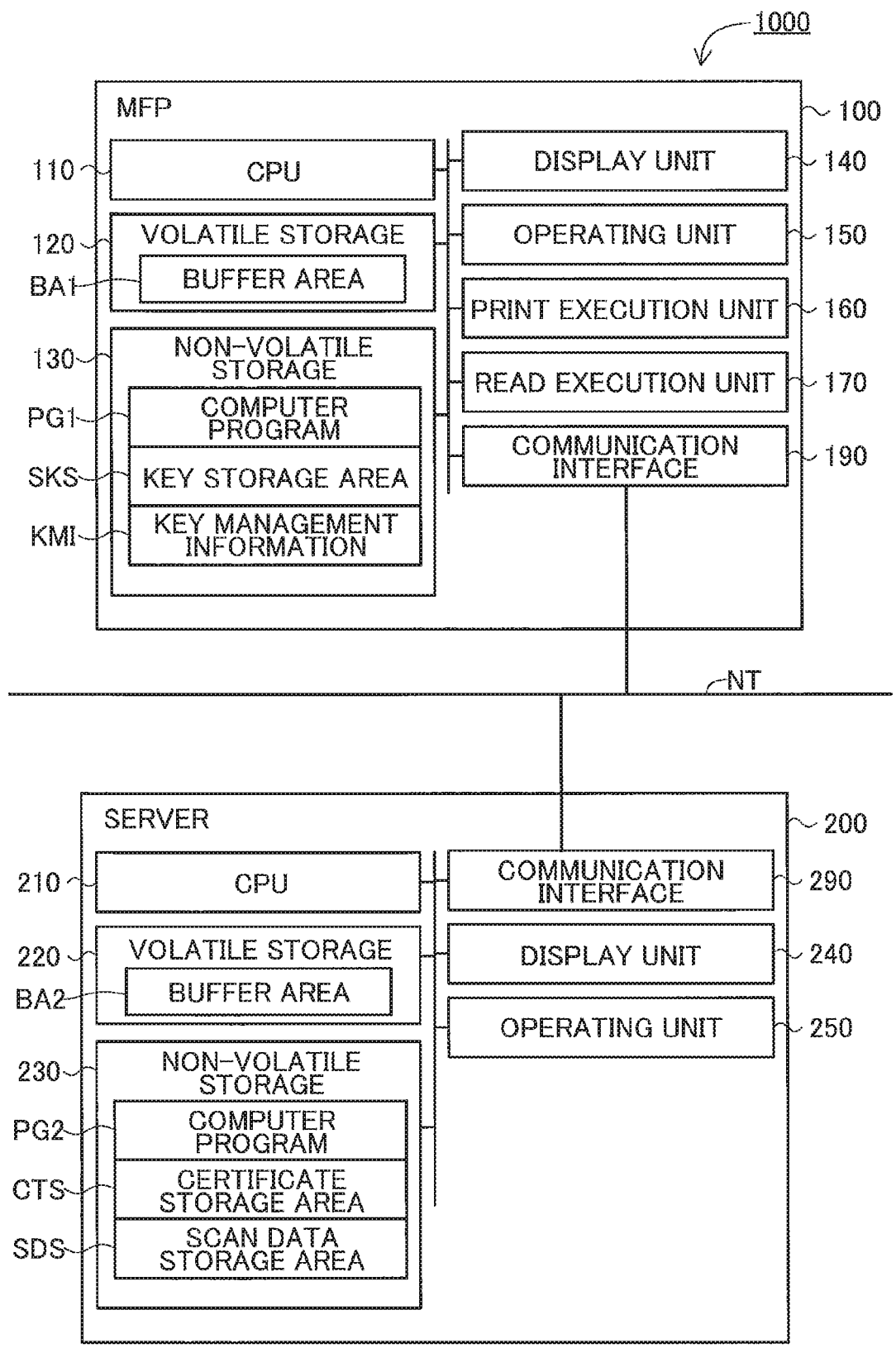
FIG. 1 is a block diagram illustrating structure of a system including a multifunction peripheral (MFP) and a server.

FIG. 1 is a block diagram illustrating the structure of a system 1000.

The system 1000 includes a multifunction peripheral (MFP) 100, and a server 200. The MFP 100 and server 200 are connected to a local area network (LAN) NT. The MFP 100 and server 200 can communicate with each other over the local area network NT.

The MFP 100 is provided with a central processing unit (CPU) 110 for controlling the MFP 100; a volatile storage 120, such as a dynamic random access memory (DRAM); a non-volatile storage 130, such as a hard disk drive (HDD) or a flash memory; a display unit 140, such as a liquid crystal display (LCD), for displaying images; an operating unit 150, such as buttons or a touchscreen for acquiring user operations; a print execution unit 160; a read execution unit 170; and a communication interface 190.

The print execution unit 160 executes a printing process under control of the CPU 110. The printing process prints images on sheets such as paper (an example of the printing medium) according to a prescribed method (laser method or inkjet method, for example). The read execution unit 170 executes a reading process under control of the CPU 110. The reading process employs a CCD or CMOS image sensor having photoelectric transducers to optically read a document or other target object and to generate scan data representing the read image.

The CPU 110 is a processor that performs data processing. The volatile storage 120 provides a buffer area BA1 for temporarily storing various intermediary data generated when the CPU 110 performs processes. The non-volatile storage 130 stores a computer program PG1, and key management information KMI. One area of the non-volatile storage 130 is also used as a key storage area SKS. The key management information KMI and key storage area SKS will be described later.

The computer program PG1 may be prestored in the non-volatile storage 130 when the MFP 100 is manufactured, for example. Alternatively, the computer program PG1 may be made available through download from a server (not illustrated) managed by the vendor of the MFP 100 or may be provided in a recorded format such as on a CD-ROM.

By executing the computer program PG1, the CPU 110 can implement a control process for controlling the MFP 100. As part of this control process, the CPU 110 can control the print execution unit 160 and read execution unit 170 to implement a printing process and a reading process, respectively. As another example of part of the control process, the CPU 110 can execute a signed file generating process described later.

The communication interface 190 functions to perform data communications with an external device such as the server 200. In the present embodiment, the communication interface 190 is an interface for connecting to the local area network NT, and specifically, a wired or wireless interface conforming to Ethernet or Wi-Fi technology.

The server 200 is a well-known computer such as a personal computer and functions as a file server that can be accessed from devices connected to the local area network NT, for example. The server 200 is provided with a CPU 210 that functions to control the server 200; a volatile storage 220, such as a DRAM; a non-volatile storage 230, such as a HDD or a flash memory; a display unit 240, such as a LCD; an operating unit 250, such as a mouse and a keyboard for acquiring user operations; and a communication interface 290.

The CPU 210 is a processor that performs data processing. The volatile storage 220 provides a buffer area BA2 for temporarily storing various intermediary data generated when the CPU 210 performs processes. The non-volatile storage 230 stores a computer program PG2. One area of the nonvolatile storage device 230 is also used as a certificate storage area CTS and a scan data storage area SDS. The scan data storage area SDS is an area of a memory for storing scan data generated by the MFP 100. The certificate storage area CTS will be described later.

Figure 2A:
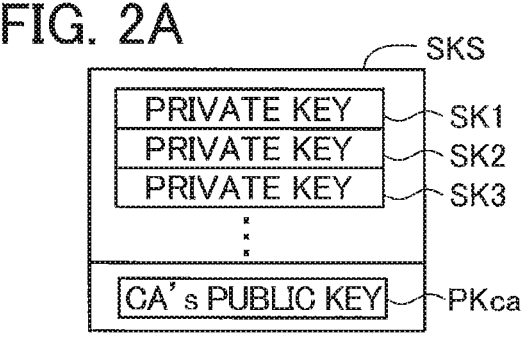

FIGS. 2A through 2D are explanatory diagrams illustrating various types of information stored in the MFP 100 and server 200. FIG. 2A is a conceptual diagram of the key storage area SKS. As illustrated in FIG. 2A, the key storage area SKS of the MFP 100 (FIG. 1) stores a plurality of private keys SK1 through SK3, and a public key certified by a certification authority (hereinafter called the CA's public key PKca).

Figure 2B:
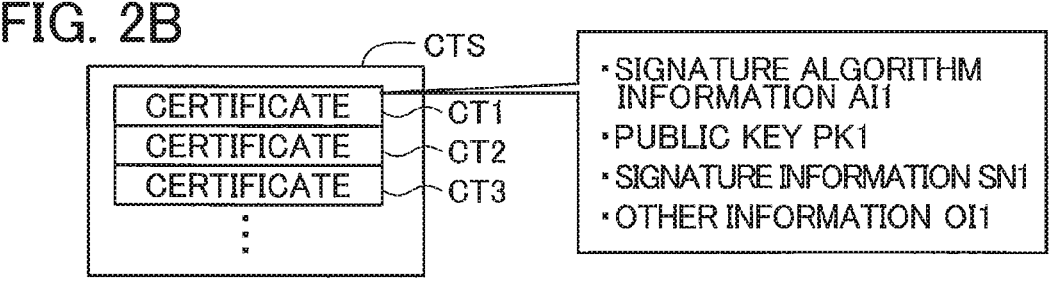

FIG. 2B is a conceptual diagram of the certificate storage area CTS. As illustrated in FIG. 2B, the certificate storage area CTS of the server 200 stores a plurality of certificates CT1 through CT3. In the present embodiment, the private keys SK1 through SK3 stored in the key storage area SKS (FIG. 2A) have a one-on-one correspondence with the certificates CT1 through CT3 stored in the certificate storage area CTS.

Here, each of the private keys SK1 through SK3 and certificates CT1 through CT3 is an individual file. In the present embodiment, the filenames given to the private keys SK1 through SK3 and certificates CT1 through CT3 are the same as their reference symbols. For example, the filename given to the private key SK1 is "SK1," and the filename given to the certificate CT1 is "CT1."

As an example, user A uses a user A's own terminal device (not illustrated) to generate the private key SK1, and the public key PK1 corresponding to the private key SK1. Using the same terminal device, user A generates a certificate signing request (CSR) that includes this public key PK1 and transmits the request CSR to a certification authority (CA). Through this procedure, user A acquires encrypted data from the CA for the certificate CT1 signed by the CA. The certificate CT1 includes the public key PK1. Using the terminal device, user A decrypts the encrypted data using the private key SK1 to obtain the certificate CT1. In this way, user A can acquire the paired private key SK1 and certificate CT1 using the terminal device. Through operations performed on the terminal device by user A, the private key SK1 is stored and saved in the key storage area SKS on the MFP 100, while the certificate CT1 corresponding to the private key SK1 is stored and saved in the certificate storage area CTS on the server 200.

Similarly, different user B may acquire a paired private key SK2 and certificate CT2 using a user B's own terminal device (not illustrated) while user C acquires a paired private key SK3 and certificate CT3 using a user C's own terminal device (not illustrated), for example. The private keys SK2 and SK3 are stored and saved in the key storage area SKS on the MFP 100, while the certificates CT2 and CT3 are stored and saved in the certificate storage area CTS on the server 200. In this way, the private keys SK1 through SK3 and their corresponding certificates CT1 through CT3 in the present embodiment have a one-on-one correspondence with the plurality of users of the MFP 100.

As illustrated in FIG. 2B, the certificate CT1 includes the public key PK1, signature information SN1, signature algorithm information AI1, and other information OI1. The public key PK1 is a public key associated with the private key SK1 described above. The signature information SN1 is information generated by the CA and is used for determining whether the certificate CT1 is authentic. The signature algorithm information AI1 includes information specifying the algorithm that the CA used when generating the signature information SN1, and specifically the hash function and public key encryption method. The other information OI1 includes various types of information, such as the version of the certificate, the period of validity for the certificate, the name of the CA that issued the certificate, and the like.

The signature information SN1 is generated as follows. The CA produces a hash value by hashing all information in the certificate CT1 excluding the signature information SN1 (the signature algorithm information AI1, public key PK1, and other information OI1) using the hash function specified in the signature algorithm information AI1. Next, the CA uses the CA's private key SKca (not illustrated; different from the user's private key SK1) to encrypt this hash value according to the public key encryption method specified in the signature algorithm information AI1. The encrypted hash value is the signature information SN1. The algorithm of the hash function may be one of the secure hash algorithms SHA-1 or SHA-256, for example. The algorithm used for the public key encryption method is RSA, for example. The CA's private key SKca is a private key associated with the CA's public key PKca that is stored in the key storage area SKS of FIG. 2A.

While not illustrated in the drawings, each of the certificates CT2 and CT3 similarly includes a public key, signature information, signature algorithm information, and other information.

Figure 2C:
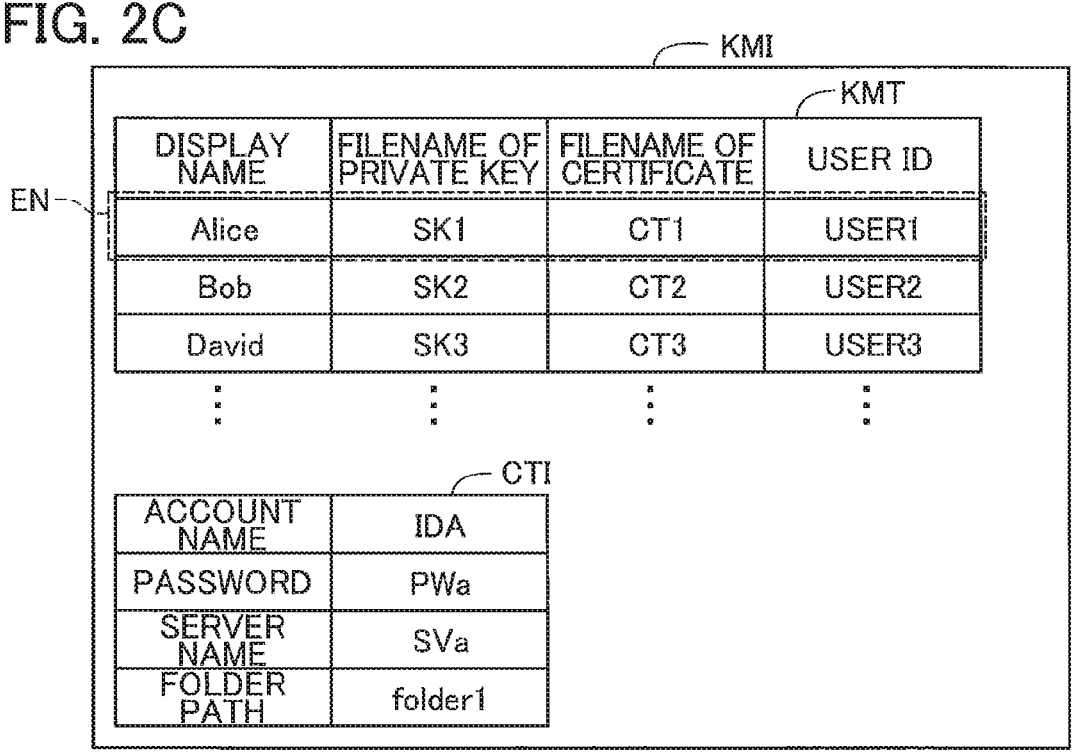

FIG. 2C is a conceptual diagram of the key management information KMI. As illustrated in FIG. 2C, the key management information KMI includes a management table KMT, and certificate destination information CTI. The management table KMT includes entries EN for respective ones of the private keys stored in the key storage area SKS. Each entry EN includes the user's display name (Alice, for example) for the owner of the private key, the filename of the private key (SK1, for example), the filename of the certificate corresponding to the private key (CT1, for example) and a user ID identifying the owner of the private key (USER1, for example). When a paired private key and certificate (the private key SK1 and certificate CT1, for example) are stored in the key storage area SKS and certificate storage area CTS, respectively, the entry EN corresponding to this private key is recorded in the management table KMT by the administrator of the MFP 100, for example.

As described above, each of the private keys SK1 through SK3 is associated with a user ID (USER1, for example) as the identification information, and a display name (Alice, for example) in the key management information KMI. In addition, the private keys SK1 through SK3 are respectively associated with the filenames of the certificates CT1 through CT3 each of which includes the corresponding public key.

The certificate destination information CTI enables the CPU 110 of the MFP 100 to access the certificate storage area CTS on the server 200 in which the certificates CT1 through CT3 are stored. Since the CPU 110 uses a file transfer protocol (FTP) to access the certificate storage area CTS on the personal computer 200 in the present embodiment, the certificate destination information CTI includes information necessary for FTP access, such as an account name, a password, and a server name. Further, the certificate destination information CTI includes information specifying the location of the certificate storage area CTS in the server 200, and specifically the folder path specifying the folder in which the certificates CT1 through CT3 are stored.

A-2: Signed File Generating Process

Figure 3:
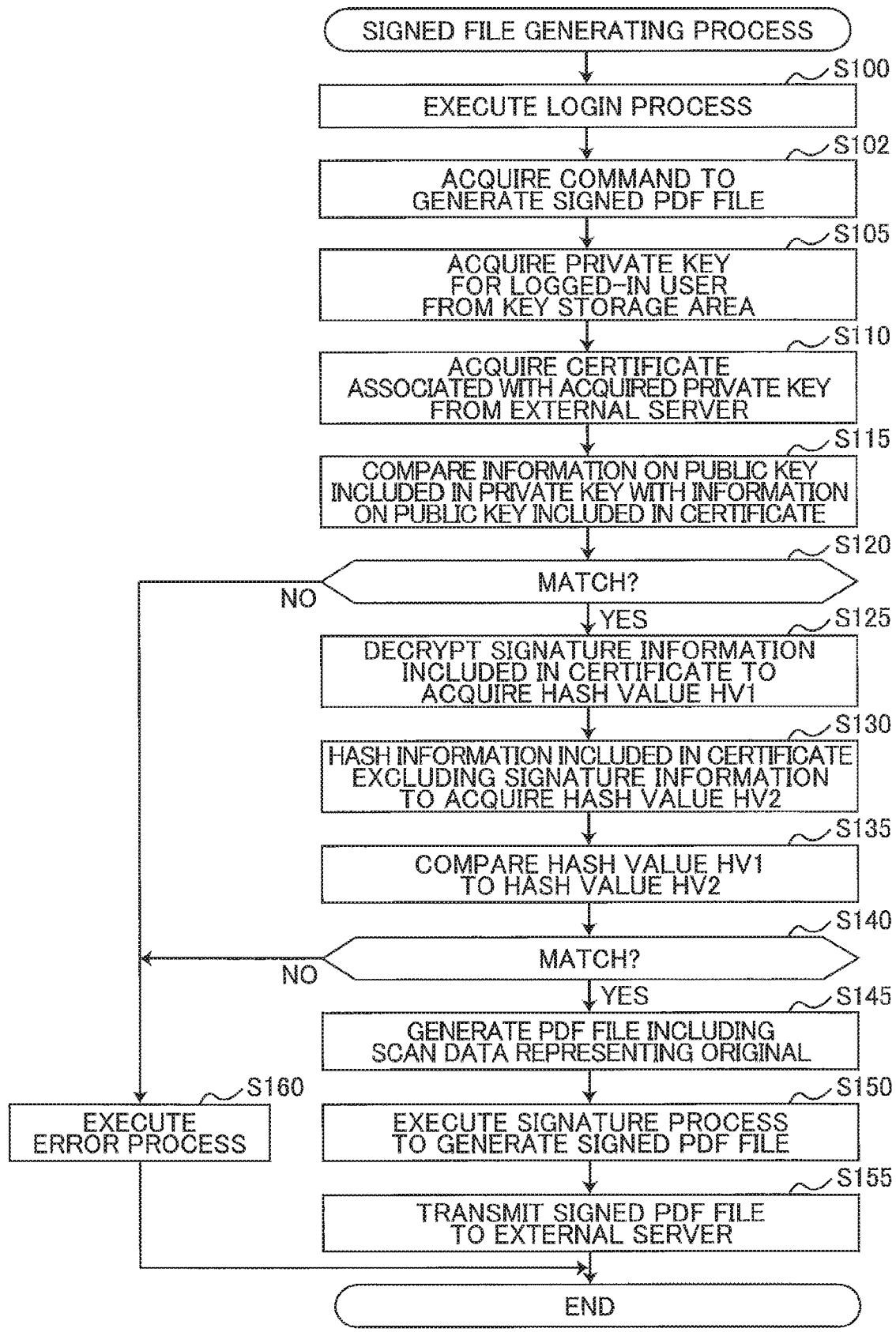
FIG. 3 is a flowchart illustrating steps in a signed file generating process according to a first embodiment.

FIG. 3 is a flowchart illustrating steps in a signed file generating process according to the first embodiment. For example, the signed file generating process is performed to acquire scan data in response to a command from a user by using the read execution unit 170 to read an original, and to generate a signed PDF file that includes the scan data.

In S100 of FIG. 3, the CPU 110 of the MFP 100 executes a login process. Since the signed file generating process in the present embodiment is executed according to a command from a user who is logged in to the MFP 100, a user who wishes to generate a signed PDF file first logs in to the MFP 100. Specifically, the CPU 110 displays a login screen (not illustrated) on the operating unit 150 in response to a login request from the user and acquires authentication information (a user ID and a password, for example) through the login screen. The CPU 110 determines whether to allow the specific user to log in on the basis of this authentication information. When login is permitted, the CPU 110 enters the specific user into a logged-in state. When login is not permitted, the CPU 110 enters the specific user into a logged-in state. When login is not permitted, the CPU 110 executes an error process. In the following description, it will be assumed that login has been permitted for the user in FIG. 2C having a user ID "USER1" and a display name "Alice."

In S102 the CPU 110 acquires a command from the user via the operating unit 150 to generate a signed PDF file. For example, the user places an original on an original platen of the read execution unit 170 and the operation is made on the operation unit 150 to input a command to generate a signed PDF file. In S105 the CPU 110 acquires the private key for the logged-in user from the key storage area SKS. Specifically, the CPU 110 searches the management table KMT for the user ID specifying the user who is currently logged in (USER1 in this example) and searches the entry EN that includes this user ID for the private key. In this example, the CPU 110 identifies the private key associated with the user ID "USER1" to be the private key SK1. Next, the CPU 110 acquires the private key SK1 from the key storage area SKS on the MFP 100 (FIG. 2A). The CPU 110 stores this private key SK1 in the buffer area BA1 of the volatile storage 120.

In S110 the CPU 110 acquires the certificate associated with the private key acquired in S105 from the server 200. Specifically, the CPU 110 searches the entry EN in the management table KMT corresponding to the currently logged-in user for the filename of the certificate corresponding to the private key acquired in S105. In this example, the CPU 110 identifies the filename "CT1" associated with the private key SK1. Using the filename of the certificate, the CPU 110 acquires the certificate associated with the private key from the external server 200. Specifically, the CPU 110 accesses the server 200 using the account name, password, and server name included in the certificate destination information CTI of FIG. 2C. The CPU 110 issues a request to the server 200 for the file having filename "CT1," i.e., the file in the folder specified by the folder path in the certificate destination information CTI (the certificate storage area CTS in FIG. 2B). Through this procedure, the CPU 110 acquires the certificate CT1 from the server 200. As described above, the CPU 110 acquires the certificate CT1 according to FTP, for example. As a variation, the CPU 110 may acquire the certificate CT1 according to a protocol other than FTP, such as Simple Mail Transfer Protocol (SMTP) or Common Internet File System (CIFS). After acquiring the certificate CT1, the CPU 110 stores the certificate CT1 in the buffer area BA1 on the volatile storage device 120. Thus, the CPU 110 can use the filename of the certificate corresponding to the private key to acquire the corresponding certificate from the server 200 properly.

In S115 through S140, the CPU 110 determines whether the certificate CT1 acquired in S110 is an authentic certificate corresponding to the private key SK1 acquired in S105. Since the CPU 110 determines in these steps whether the certificate to be outputted in S155 described later is an authentic certificate, the CPU 110 can output a proper certificate even when the certificate is acquired from an external device such as the server 200.

The process for determining whether the acquired certificate CT1 is an authentic certificate has two stages. In S115 and S120, the CPU 110 performs a simple determination using a first determination method as the first stage of the determination (first determination). In S125 through S140 the CPU 110 performs a determination using a second determination method as the second stage of the determination (second determination). The second determination is more complex than the first determination. These steps will be described next in greater detail.

In S115 the CPU 110 compares information on the public key included in the private key SK1 with information on the public key included in the certificate CT1. In RSA, the private key SK1 includes a plurality of information items, such as a modulus, public exponent, private exponent, first prime, and second prime. The public key associated with the private key SK1 (the public key included in the corresponding certificate CT1) includes the modulus and public exponent extracted from the information items included in the private key SK1. Accordingly, the private key SK1 and certificate CT1 both include information items for the public key (specifically, the modulus and public exponent) as shared information. When the certificate CT1 acquired in S110 is the authentic certificate CT1 associated with the private key SK1, both information items for the public key included in the private key SK1 and information items for the public key included in the certificate CT1 are the information items for the same public key PK1. In this case, information items for the public key included in the private key SK1 matches information items for the public key included in the certificate CT1. In the present embodiment, the CPU 110 compares the value of the modulus in the public key included in the private key SK1 to the value of the modulus in the public key included in the certificate CT1.

In S120 the CPU 110 determines whether the information on the public key included in the private key SK1 matches the information on the public key included in the certificate CT1. When the information matches (S120: YES), the CPU 110 advances to the process for the second stage of the determination (S125 through S140). If the information does not match (S120: NO), it is likely that the certificate CT1 acquired in S110 is not the authentic certificate CT1 associated with the private key SK1. Accordingly, the CPU 110 executes an error process in S160 in this case, and subsequently ends the signed file generating process. In the error process, the CPU 110 notifies the user that an authentic certificate CT1 for the private key SK1 could not be acquired.

In S125 the CPU 110 decrypts the signature information SN1 included in the certificate CT1 using the CA's public key PKca (see FIG. 2A) to acquire a hash value HV1.

In S130 the CPU 110 hashes the information included in the certificate CT1 excluding the signature information SN1 (the signature algorithm information AI1, public key PK1, and other information OI1) using the hash function specified by the signature algorithm information AI1 in order to acquire a hash value HV2.

In S135 the CPU 110 compares the hash value HV1 acquired in S125 to the hash value HV2 acquired in S130.

In S140 the CPU 110 determines whether the hash values HV1 and HV2 match. When the hash value HV1 matches the hash value HV2 (S140: YES) the CPU 110 advances to S145. However, if the hash value HV1 does not match the hash value HV2 (S140: NO), then it is likely that the certificate CT1 acquired in S110 is not an authentic certificate CT1 for the private key SK1. Accordingly, in S160 the CPU 110 executes the error process and subsequently ends the signed file generating process.

As can be understood from the above description, the first determination method (S115 and S120) simply compares the information on the public key associated with the private key SK1 to the information on the public key included in the certificate CT1, while the second determination method (S125 through S140) includes a process for generating the hash value HV2 using a hash function and a process for decrypting the signature information SN1. Accordingly, the second determination method requires a higher processing load than the first determination method.

In S145 the CPU 110 generates a PDF file PF (not illustrated) that includes scan data SD representing the original. Specifically, the CPU 110 controls the read execution unit 170 to read the original and acquires the scan data SD representing the original from the read execution unit 170. Next, the CPU 110 generates the PDF file PF including the scan data SD and stores the PDF file PF in the buffer area BA1 on the volatile storage 120.

Figure 2D:

In S150 the CPU 110 executes a signature process on the PDF file PF to generate a signed PDF file SPF. FIG. 2D illustrates an example of the signed PDF file SPF. The signed PDF file SPF includes the scan data SD, the certificate CT1, and signature information SNu. Specifically, the CPU 110 hashes the PDF file PF generated in S145 using the hash function specified in the signature algorithm information AI1 to acquire a hash value HVu. The CPU 110 then encrypts the hash value HVu using the private key SK1 of the logged-in user according to the public key encryption method specified in the signature algorithm information AI1. The encrypted hash value HVu is the signature information SNu. The CPU 110 generates the signed PDF file SPF (see FIG. 2D) by storing the signature information SNu and the certificate CT1 associated with the private key SK1 used to generate the signature information SNu in the PDF file PF.

In S155 the CPU 110 transmits the signed PDF file SPF generated in S150 to the external server 200. The signed PDF file SPF is transmitted according to FTP, for example. As a variation, the CPU 110 may transmit the signed PDF file SPF according to a protocol other than FTP, such as SMTP or CIFS. Upon receiving the signed PDF file SPF, the CPU 210 of the server 200 stores the signed PDF file SPF in the designated folder (the scan data storage area SDS in FIG. 1). The signed PDF file SPF stored on the server 200 is available for use by the user.

According to the first embodiment described above, the MFP 100 (CPU 110) acquires the private key SK1 from the key storage area SKS in the nonvolatile storage 130 of the MFP 100 itself (S105) and acquires the certificate CT1 including the public key PK1 associated with the private key SK1 from the server 200 via the communication interface 190 (S110). The MFP 100 executes the signature process that includes a process for generating the signature information SNu by encrypting the hash value HVu using the private key SK1 (S150). The MFP 100 outputs a signed PDF file to the server 200 that includes the signature information SNu, certificate CT1, and scan data SD. This method can ensure security since the private key SK1 to be managed as confidential information is stored in the key storage area SKS on the MFP 100 that uses the private key SK1. Further, since there is less necessity to handle the public key PK1 as confidential information compared to the private key SK1, the certificate CT1 that includes the public key PK1 is acquired from the server 200. Thus, the certificate CT1 need not be stored or saved on the nonvolatile storage 130 of the MFP 100. Therefore, the required capacity of the nonvolatile storage 130 in the MFP 100 can be reduced without compromising security. That is, this method requires less capacity for the nonvolatile storage 130 than a method in which both the private key SK1 and the corresponding certificate CT1 are stored in the nonvolatile storage 130 of the MFP 100. Since the method of the present embodiment uses a private key and a certificate to output signed data (and specifically the signed PDF file SPF), it may be necessary to manage a private key and a certificate for each user, for example. If both the private keys and certificates were saved on the MFP 100 itself, the required capacity of the nonvolatile storage 130 on the MFP 100 is apt to increase, but the present embodiment can reduce the required capacity of the nonvolatile storage 130 without compromising security.

Further, in the method according to the embodiment, the MFP 100 transmits the signed PDF file SPF to the server 200 that stores the certificate CT1 (S155). Hence, the same server 200 can store both the signed PDF file SPF and the certificate CT1. Accordingly, there is no need to provide an external device simply for storing the certificate CT1, thereby simplifying the system 1000.

In the present embodiment, each of the private keys SK1 through SK3 is associated with a user ID (USER1, USER2, or USER3, for example) in the management table KMT of FIG. 2C. In the login process (S100), the user provides a specific user ID (USER1, for example). The CPU 110 acquires the private key SK1 associated with this specific user ID (S105) and acquires the certificate CT1 from the server 200 that includes the public key PK1 associated with the private key SK1 (S110). In other words, when a first user ID (USER1, for example) is specified, the MFP 100 acquires a first private key (the private key SK1, for example) associated with the first user ID from the key storage area SKS. When a second user ID (USER2, for example) is specified, the MFP 100 acquires a second private key (the private key SK2, for example) associated with the second user ID from the key storage area SKS. Next, if the first user ID was specified, the MFP 100 acquires a certificate that includes the first public key associated with the first private key (the certificate CT1, for example) from the server 200. If the second user ID was specified, the MFP 100 acquires a certificate that includes the second public key associated with the second private key (the certificate CT2, for example) from the server 200. Thus, the present embodiment can reduce the required capacity of the nonvolatile storage 130 without compromising security, even when using a plurality of private keys SK1 and SK2 and a plurality of certificates CT1 and CT2. If a private key and a certificate are managed for each user, as in the present embodiment, the numbers of private keys and certificates to be managed may become quite large. However, the present embodiment can reduce the required capacity for the nonvolatile storage 130 even in such cases.

In the present embodiment, the MFP 100 executes the first determination process (S115 and S120) using the first determination method to determine whether the certificate CT1 is an authentic certificate. When the MFP 100 determines in the first determination process that the certificate CT1 is an authentic certificate (S120: YES), the MFP 100 executes the second determination process (S125 through S140) using the second determination method to determine whether the certificate CT1 is an authentic certificate. If the MFP 100 determines in the first determination process that the certificate CT1 is not an authentic certificate (S120: NO), then the MFP 100 does not execute the second determination process, which requires a higher processing load than the first determination process. Thus, the MFP 100 can efficiently determine whether the certificate CT1 is an authentic certificate.

In the first determination process of S115 and S120 in the present embodiment described above, the MFP 100 determines whether the modulus of the public key PK1 included in the private key SK1 matches the modulus of the public key PK1 included in the certificate CT1. In this way, the MFP 100 uses a relatively simple method for tentatively determining whether the certificate CT1 is an authentic certificate.

B. Second Embodiment

In the second embodiment, the management table KMT in FIG. 2C does not include the filename of a certificate in each entry EN. That is, each of the plurality of private keys SK1 through SK3 stored in the key storage area SKS is not associated with the filename of the corresponding certificate among the plurality of certificates CT1 through CT3. The remaining configuration of the system according to the second embodiment is identical to the system 1000 in the first embodiment.

Figure 4:
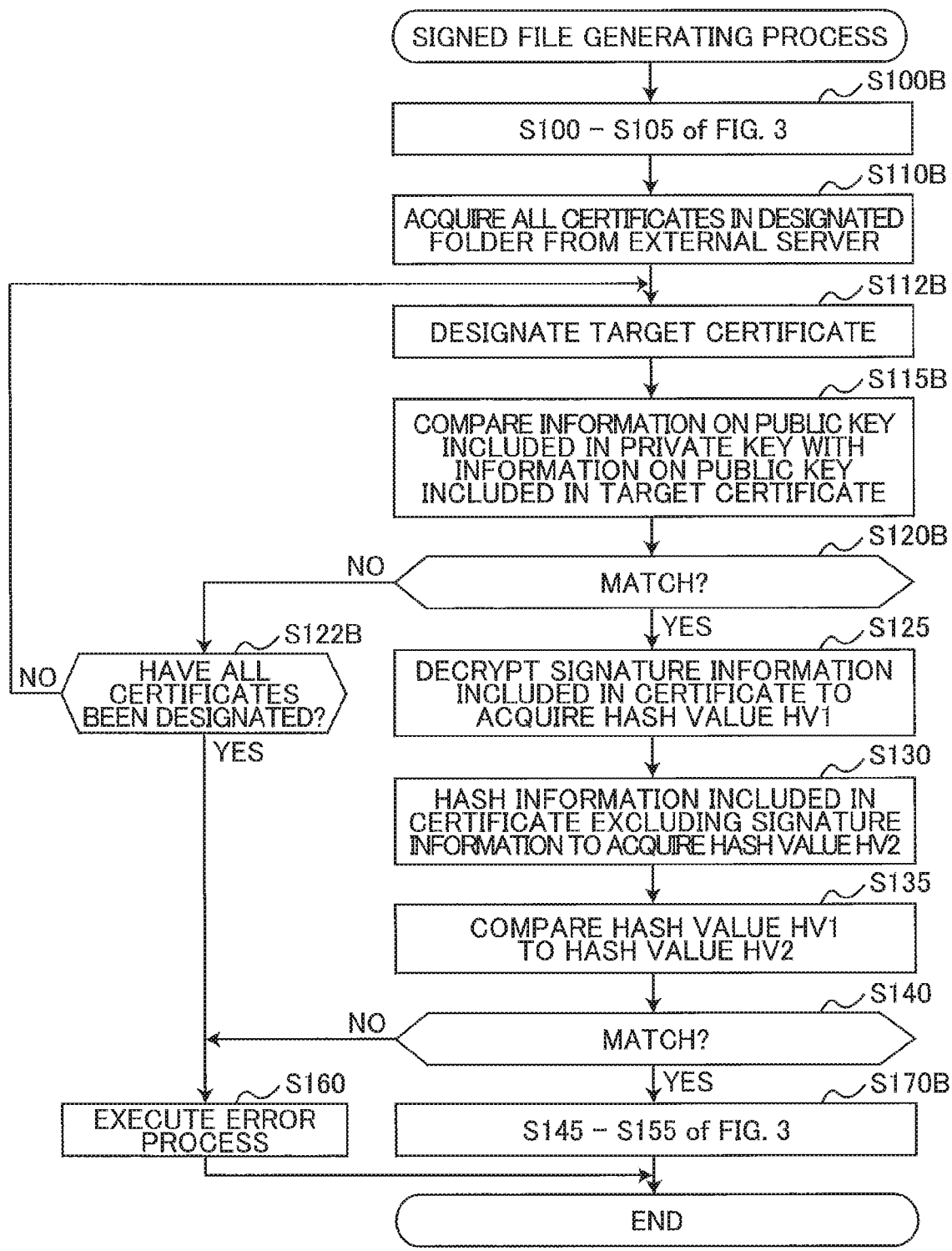
FIG. 4 is a flowchart illustrating steps in a signed file generating process according to a second embodiment.

In the second embodiment, the MFP 100 executes a different process for generating a signed file from the signed file generating process in FIG. 3. FIG. 4 is a flowchart illustrating steps in a signed file generating process according to the second embodiment.

After executing a process in S100B identical to that in S100 through S105 of FIG. 3, in S110B the CPU 110 acquires all certificates from the server 200 in the designated folder, i.e., in the folder specified by the folder path included in the certificate destination information CTI. Specifically, the CPU 110 accesses the server 200 according to FTP and requests all files in the folder to the server 200. The server 200 transmits all files in the designated folder, and specifically all certificates stored in the certificate storage area CTS, including certificates CT1 through CT3, to the MFP 100. The CPU 110 stores all the certificates acquired from the server 200 in the buffer area BA1 of the volatile storage 120.

In S112B the CPU 110 designates a single target certificate from among all acquired certificates. In S115B the CPU 110 compares information on the public key PK1 included in the private key SK1 acquired in S105 with the information on the public key included in the target certificate, as described in S115 of FIG. 3.

In S120B the CPU 110 determines whether the information on the public key PK1 included in the private key SK1 matches the information on the public key included in the target certificate. If these information match (S120B: YES), the CPU 110 advances to the process for the second stage determination (S125 through S140). However, if the information does not match (S120B: NO), the CPU 110 advances to the process in S122B.

In S122B the CPU 110 determines whether all acquired certificates have been designated to be the target certificate. If all certificates have been designated (S122B: YES), the CPU 110 executes the error process in S160 and subsequently ends the signed file generating process. However, if there remain unselected certificates (S122B: NO), the CPU 110 returns to S112B and designates a previously unselected certificate to be a new target certificate.

In S125 through S140, the CPU 110 executes the same processes described in S125 through S140 of FIG. 3 on the target certificate. Subsequently in S170B the CPU 110 executes similar processes to S145 through S155 of FIG. 3 to generate and output a signed PDF file SPF.

According to the second embodiment described above, the MFP 100 acquires a plurality of certificates stored in the certificate storage area CTS of the server 200 (S110B) and designates the certificate CT1 associated with the private key SK1 from among the plurality of acquired certificates (S112B through S122B). In this way, the MFP 100 can acquire the appropriate certificate from among the plurality of certificates, even when the filename of the certificate CT1 associated with the private key SK1 is not recorded in the key management information KMI.

C. Third Embodiment

Figure 5:
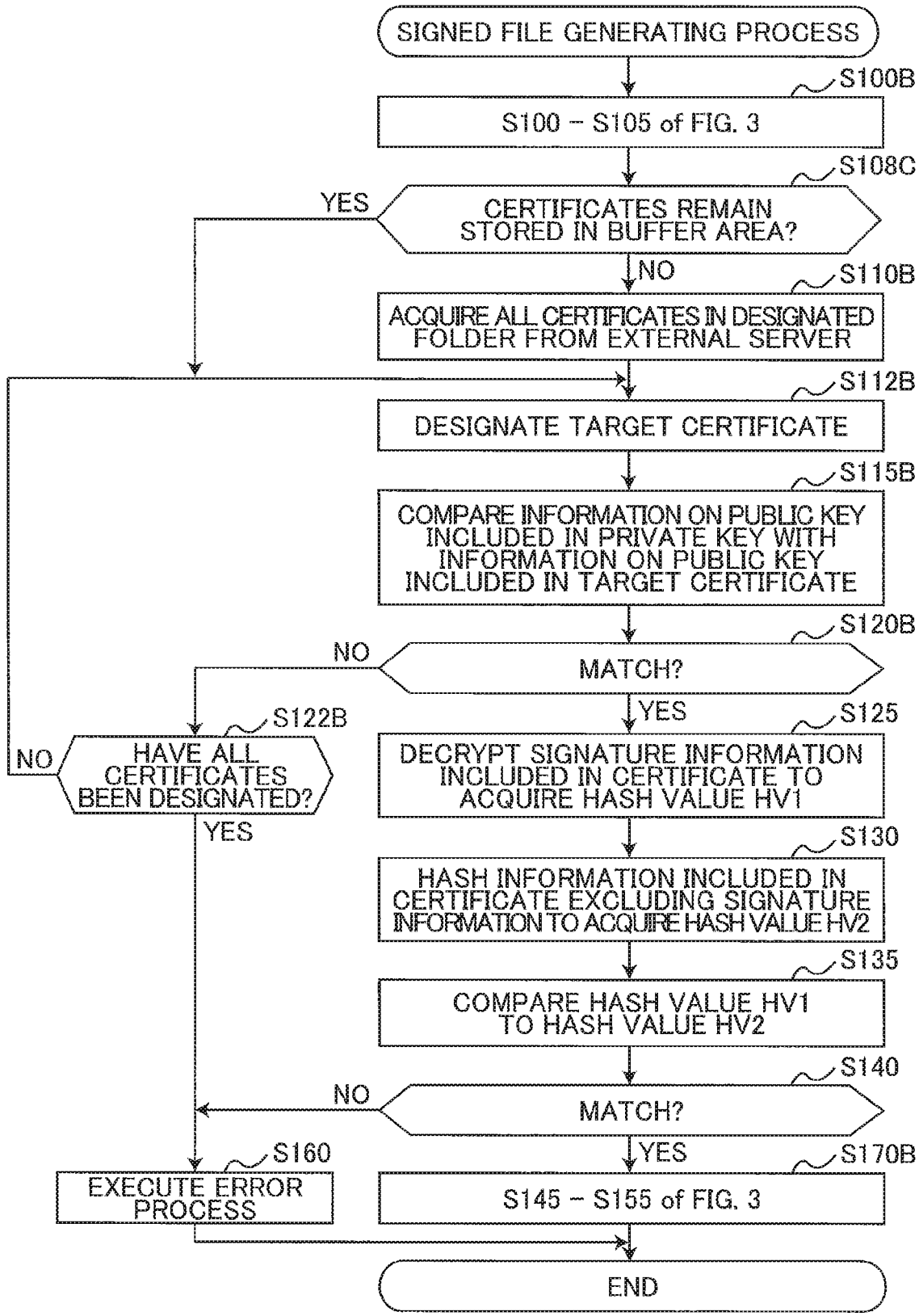
FIG. 5 is a flowchart illustrating steps in a signed file generating process according to a third embodiment.

The configuration of the system according to the third embodiment is identical to that for the system according to the second embodiment. In the third embodiment, the MFP 100 executes a different process for generating a signed file from the signed file generating process according to the second embodiment illustrated in FIG. 4. FIG. 5 is a flowchart illustrating steps in a signed file generating process according to the third embodiment.

The signed file generating process in FIG. 5 differs from the signed file generating process in FIG. 4 in that a step S108C has been added between steps S100B and S110B in FIG. 5. The remaining process of FIG. 5 is identical to that in FIG. 4.

In S108C the CPU 110 determines whether the plurality of certificates acquired in S110B of a previously executed signed file generating process (hereinafter called previously acquired certificates) remains stored in the buffer area BA1 of the volatile storage 120. In the present embodiment, the plurality of previously acquired certificates may be deleted from the buffer area BA1 if one of the events (1) through (3) described below occurs. If none of the following events (1) through (3) has occurred, the previously acquired certificates will be saved in the buffer area BA1. Accordingly, a plurality of previously acquired certificates may still remain in the buffer area BA1 at the timing of S108C. (1) When power to the MFP 100 is turned off, (2) when the MFP 100 is restarted, and (3) when the area of the buffer area BA1 must be allocated to execute another process (a facsimile process or a printing process, for example).

If the plurality of previously acquired certificates are not stored in the buffer area BA1 (S108C: NO), in S110B the CPU 110 acquires all certificates from the personal computer 200 in the designated folder, i.e., in the folder specified by the folder path included in the certificate destination information CTI. However, if the plurality of previously acquired certificates is stored in the buffer area BA1 (S108C: YES), the CPU 110 skips S110B.

Thus, in the signed file generating process according to the third embodiment, MFP 100 temporarily leaves the plurality of certificates which has been acquired from the server 200 in S110B stored in the buffer area BA1 even after outputting the signed PDF file SPF and completing the signed file generating process. When the MFP 100 subsequently executes the signed file generating process again and a private key is again acquired in S105 (S100B), the MFP 100 does not reacquire the certificates from the server 200 if the corresponding certificate is still stored in the buffer area BA1 (S108C: YES) but uses the certificate stored in the buffer area BA1 to generate and output the signed PDF file SPF. As a result, the MFP 100 can reduce unnecessary accesses to the server 200 and can efficiently generate and output the signed PDF file SPF, even when the certificate is stored on the server 200.

D. Fourth Embodiment

Figure 6:
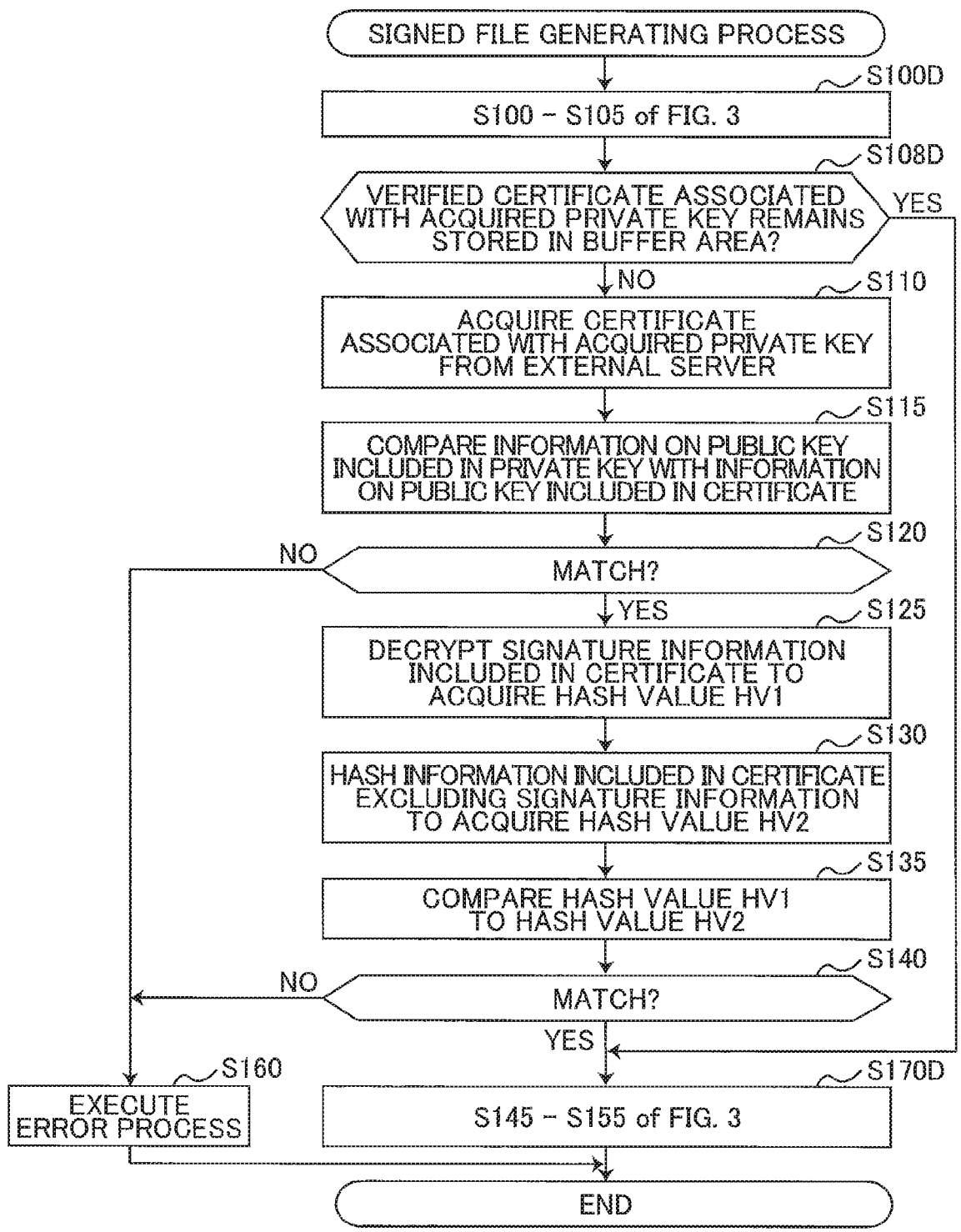
FIG. 6 is a flowchart illustrating steps in a signed file generating process according to a fourth embodiment.

The configuration of the system according to the fourth embodiment is identical to that for the system according to the first embodiment. In the fourth embodiment, the MFP 100 executes a different process for generating a signed file from the signed file generating process according to the first embodiment illustrated in FIG. 3. FIG. 6 is a flowchart illustrating steps in a signed file generating process according to the fourth embodiment.

The signed file generating process in FIG. 6 differs from the signed file generating process in FIG. 3 in that a step S108D has been added between steps S100D and S110 in FIG. 6. The remaining process of FIG. 6 is identical to that in FIG. 3.

In S108D the CPU 110 determines whether the certificate corresponding to the private key just acquired in S105 (S100D) is a certificate stored in the buffer area BA1 of the volatile storage 120 that was acquired from the server 200 in S110 of a previously executed signed file generating process and was also verified to be authentic in S115 through S140 of the previously executed signed file generating process. Hereinafter the certificates acquired from the server 200 in S110 of the previously executed signed file generating process and verified to be authentic in S115 through S140 of the previously executed signed file generating process will be called verified certificates. In S108D the CPU 110 determines whether the verified certificate associated with the private key just acquired in S105 (S100D) remains stored in the buffer area BA1 of the volatile storage 120. In the present embodiment, verified certificates may be deleted from the buffer area BA1 if one of the events (1) through (3) described below occurs. If none of the following events (1) through (3) has occurred, a plurality of verified certificates will be saved in the buffer area BA1. Accordingly, one or more verified certificates may still remain in the buffer area BA1 at the timing of S108D. (1) When the power to the MFP 100 was turned off, (2) when the MFP 100 was restarted, and (3) when the area of the buffer area BA1 had to be allocated in order to execute another process (a facsimile process or a printing process, for example).

In place of or in addition to events (1) through (3) described above, verified certificates may be deleted one by one from the buffer area BA1 in an order in which the timing stored in the buffer area BA1 are earlier when the number of verified certificates stored in the buffer area BA1 exceeds a prescribed number (two, for example).

If the corresponding verified certificate is not stored in the buffer area BA1 (S108D: NO), in S110 the CPU 110 acquires the certificate corresponding to the acquired private key from the server 200. However, if the corresponding verified certificate is stored in the buffer area BA1 (S108D: YES), the CPU 110 skips the processes of S110 through S140 and advances directly to S170D. In S170D the CPU 110 executes the processes of S145 through S155 in FIG. 3. That is, the CPU 110 generates and outputs a signed PDF file SPF using the corresponding verified certificate stored in the buffer area BA1.

In the fourth embodiment described above, a certificate acquired in S110 of a signed file generating process and verified to be authentic in S115 through S140 of the same process is temporarily stored in the buffer area BA1 even after the MFP 100 outputs the signed PDF file SPF in the same process. Thus, when the MFP 100 subsequently executes the signed file generating process again and a private key is reacquired in S105, the MFP 100 does not reacquire the certificate from the server 200 if the corresponding verified certificate is currently stored in the buffer area BA1 (S108D: YES). In this case, the MFP 100 skips the process for verifying the certificate (S110 through S140) and uses the certificate stores in the buffer area BA1 to generate and output the signed PDF file SPF (S170D). This method prevents the MFP 100 from unnecessarily accessing the server 200 and from unnecessarily performing a verification process on the certificate. As a result, the MFP 100 can more efficiently generate and output a signed PDF file SPF, even when the certificate is stored on the server 200.

E. Variations of Embodiments (1) In the embodiments described above, a private key and a certificate are used for signing a PDF file that includes scan data SD. However, a private key and a certificate may be used for other processes.

For example, the MFP 100 may also function as a server that communicates with a user's terminal device (not shown) as a client. In this case, the MFP 100 stores its own server certificate in the certificate storage area CTS of the server 200 and stores a private key associated with the server certificate in the key storage area SKS of the MFP 100. When the MFP 100 receives a connection request from the user's terminal device, the MFP 100 accesses the server 200 to acquire the server certificate from the server 200. Next, the MFP 100 executes steps S125 through S140 in FIG. 3, for example, to determine whether the server certificate is authentic. The MFP 100 transmits the server certificate to the terminal device when the server certificate is authentic.

Upon receiving the server certificate, the terminal device executes steps S125 through S140 in FIG. 3, for example, to determine whether the server certificate is authentic. If the server certificate is authentic, the terminal device then encrypts a common key using the public key included in the server certificate, and transmits the encrypted common key to the MFP 100.

Upon receiving the encrypted common key, the MFP 100 decrypts the encrypted common key using the private key associated with the server certificate that is stored in the key storage area SKS. As a result, the MFP 100 acquires the common key. Since both the MFP 100 and the terminal device now possess the common key, the MFP 100 and the terminal device can use this common key to perform encrypted communications with each other.

As can be understood from the above description, in the embodiments described above, the process for encrypting the hash value HVu to generate the signature information SNu (S150 of FIG. 3) is an example of the converting specific data. In the variation described above, the process for decrypting the encrypted common key to acquire the common key is an example of the converting specific data. In the embodiments described above, transmission of the signed PDF file SPF that includes the signature information SNu and the certificate CT1 (S155 of FIG. 3) is an example of the outputting the converted specific data and the certificate. In the variation described above, transmission of the server certificate to the terminal device is an example of outputting the certificate.

Further, in the embodiments described above, the private key and the certificate may be used for generating signed data by signing data other than a PDF file that includes scan data SD. Data other than a PDF file may include a text file, an image file generated with a drawing application, and a document file generated with a document preparing application.

(2) In the embodiments described above, the certificate storage area CTS for storing the certificates CT1 through CT3 is provided in the server 200 (see FIG. 2B). However, the certificates CT1 through CT3 may be stored in another external device, such as a hard disk drive, a USB memory, or another external storage device connected to the MFP 100 through a USB interface. Alternatively, the certificates CT1 through CT3 may be stored on a cloud server connected to the MFP 100 over the Internet.

(3) In the embodiments described above, the operation is made on the MFP 100 by the user to input a user ID when performing a login process (S100 of FIG. 3). This user ID is designated as identification information associated with a private key, and the MFP 100 acquires the private key associated with the user ID (S105 of FIG. 3). However, rather than executing the login process, the MFP 100 may display a selection screen (not shown) on the display unit 140 after S102 of FIG. 3. The selection screen includes a list of user display names (Alice, for example) as identification information associated with private keys. The MFP 100 may then acquire a user command specifying one of the display names through the selection screen. In this case, in S105 the MFP 100 acquires the private key associated with the specified display name (Alice, for example). Further, instead of a list of user display names, the selection screen displayed at this time may include a list of filenames for certificates.

(4) In the embodiments described above, the external device that stores the certificates CT1 through CT3 and the device that stores the signed PDF files SPF are both the server 200. However, the external device storing the certificates CT1 through CT3 may be different from the device that stores the signed PDF files SPF. For example, one of the external device storing the certificates CT1-CT3 and the device storing the signed PDF file SPF may be a USB memory connected to the MFP 100 through a USB interface, while the other may be the server 200.

(5) In the embodiments described above, the MFP 100 manages a plurality of private keys SK1 through SK3, and a plurality of corresponding certificates CT1 through CT3. However, the MFP 100 may instead simply manage one private key and one corresponding certificate. In this case, the management table KMT of FIG. 2C is unnecessary.

(6) In the embodiments described above, the MFP 100 executes a process for determining whether the certificate acquired from the personal computer 200 is authentic (S115 through S140 of FIG. 3, for example), but all or part of this process may be omitted. For example, steps S115 through S140 and S160 may be omitted from FIG. 3. It is also possible to omit only steps S115 and S120 from FIG. 3. Alternatively, steps S125 through S140 may be omitted from FIG. 3.

(7) In S115 of FIG. 3, the MFP 100 compares the value of the modulus for the public key PK1 included in the private key SK1 to the value of the modulus for the public key PK1 included in the certificate CT1. However, in place of or in addition to this process, the MFP 100 may compare the value of the public exponent for the public key PK1 included in the private key SK1 to the value of the public exponent for the public key PK1 included in the certificate CT1.

(8) In the embodiments described above, each private key has a one-on-one correspondence with a user, but the present disclosure is not limited to this arrangement. For example, a single private key may be associated with a plurality of users. Alternatively, a single user may be associated with a plurality of private keys. For example, if a plurality of private keys is associated with the user currently logged in to the MFP 100, the MFP 100 may display a selection screen that includes a list of the plurality of private keys (or their corresponding certificates) in S105 of FIG. 3. Next, the MFP 100 may acquire a user command selecting one of the private keys in order to acquire a single private key on the basis of the user's selection.

(9) While the information processing device that performs the signed file generating process is the MFP 100 in the embodiments described above, the information processing device may be a standalone scanner, or may be a terminal device such as a personal computer or a smartphone. In the latter case, the terminal device may generate a signed file by adding a signature to a file already saved on its own non-volatile storage. Alternatively, the terminal device may acquire scan data SD from a multifunction peripheral or a scanner and sign a file including the scan data SD to generate a signed file. The information processing device may also be a file server. In this case, the file server may generate a signed file by signing a file stored in a prescribed folder, for example. Here, the file server stores the signed file on its own hard disk and outputs the signed file to a client upon receiving a request from the client. The file server in this example may be a cloud server that includes a plurality of devices (computers, for example) capable of communicating with each other over a network.

(10) In the embodiments described above, part of the configuration implemented in hardware may be replaced with software and, conversely, all or part of the configuration implemented in software may be replaced with hardware.

(11) When all or some of the functions of the present disclosure are implemented with computer programs, the programs may be stored on a computer-readable storage medium (a non-transitory computer-readable storage medium, for example). The programs may be used on the same storage medium on which they were supplied or may be transferred to a different storage medium (computer-readable storage medium). The "computer-readable storage medium" may be a portable storage medium, such as a memory card or CD-ROM; an internal storage built into the computer, such as any of various ROM or the like; or an external storage device, such as a hard disk drive, connected to the computer.

While the description has been made in detail with reference to specific embodiments and variations thereof, these embodiments are intended to facilitate understanding of the present disclosure and are not intended to limit the disclosure. It would be apparent to those skilled in the art that many modifications and variations may be made thereto.

What is claimed is:

1. An information processing device comprising:
a non-volatile storage configured to store a plurality of private keys including a first private key and a second private key and a plurality of sets of correspondence information including first correspondence information and second correspondence information, the first correspondence information associating first user identification information, first private-key identification information, and first certificate identification information with each other, the second correspondence information associating second user identification information, second private-key identification information, and second certificate identification information with each other, the first private key being stored in association with the first private-key identification information, the second private key being stored in association with the second private-key identification information;
an input interface;
a communication interface;
a processor comprising hardware; and
a memory storing computer-readable instructions therein, the computer-readable instructions, when executed by the processor, causing the information processing device to perform:
receiving an input designating user identification information via the input interface;
in response to receiving the input designating the first user identification information, identifying the first private-key identification information and the first certificate identification information using the first correspondence information corresponding to the first user identification information;
in response to identifying the first private-key identification information, acquiring the first private key corresponding to the first private-key identification information from the non volatile storage as a private key;
in response to identifying the first certificate identification information, acquiring a first certificate identified by the first certification identification information from a specific external device via the communication interface as a certificate, the first certificate including a first public key corresponding to the first private key as a public key, the specific external device being different from the information processing device;
in response to receiving the input designating the second user identification information, identifying the second private-key identification information and the second certificate identification information using the second correspondence information corresponding to the second user identification information;
in response to identifying the second private-key identification information, acquiring the second private key corresponding to the second private-key identification information from the non-volatile storage as the private key;
in response to identifying the second certificate identification information, acquiring a second certificate identified by the second certificate identification information from the specific external device via the communication interface as the certificate, the second certificate including a second public key corresponding to the second private key as the public key;
converting specific data using the acquired private key to generate converted specific data, the converting including one of encrypting the specific data and decrypting the specific data encrypted using the public key included in the acquired certificate; and
outputting the acquired certificate.

2. The information processing device according to claim 1, wherein the outputting further outputs the converted specific data after encrypting the specific data.

3. The information processing device according to claim 1, wherein the computer-readable instructions, when executed by the processor, cause the information processing device to further perform:
acquiring data to be signed; and
generating the specific data according to the data to be signed, wherein the encrypting encrypts the specific data using the private key to generate signature data as the converted specific data, and wherein the outputting outputs signed data including the data to be signed, the signature data, and the acquired certificate.

4. The information processing device according to claim 3, wherein the outputting transmits the signed data to the specific external device via the communication interface.

5. The information processing device according to claim 1, wherein the first certificate identification information is a first filename given to the first certificate, and the second certificate identification information is a second filename given to the second certificate.

6. The information processing device according to claim 1, wherein the computer-readable instructions, when executed by the processor, cause the information processing device to further perform determining whether the acquired certificate is an authentic certificate corresponding to the specific acquired private key, and wherein the outputting outputs the acquired certificate in response to determining that the acquired certificate is the authentic certificate.

7. The information processing device according to claim 6, wherein the determining comprises:

performing a first determination using a first determination method for determining whether the acquired certificate is an authentic certificate;

in response to determining that the acquired certificate is the authentic certificate in the first determination, performing a second determination using a second determination method for determining whether the acquired certificate is an authentic certificate, the second determination method requiring a higher processing load than the first determination method; and wherein in response to determining that the acquired certificate is not the authentic certificate in the first determination, the second determination is not performed.

8. The information processing device according to claim 7, wherein the public key includes a plurality of information items, and the private key includes at least part of the plurality of information items included in the public key corresponding to the private key as shared information, and wherein in the first determination, a determination is made to determine whether the shared information, which is included in the private key acquired from the non-volatile storage, matches the at least part of the plurality of information items of the public key, which is included in the acquired certificate.

9. The information processing device according to claim 1, further comprising:

a temporary storage configured to temporarily store the acquired certificate even if the acquired certificate is outputted, wherein the computer-readable instructions, when executed by the processor, cause the information processing device to further perform determining whether the certificate including the public key corresponding to the private key remains stored in the temporary storage, and wherein the certificate is acquired not from the specific external device but from the temporary storage in a case where the certificate corresponding to the private key acquired again remains stored in the temporary storage in a state where the private key is acquired again after the certificate is outputted.

10. A non-transitory computer readable storage medium storing a set of program instructions installed on and executed by a processor for controlling an information processing device including:

a non-volatile storage configured to store a plurality of private keys including a first private key and a second private key and a plurality of sets of correspondence information including first correspondence information and second correspondence information, the first correspondence information associating first user identification information, first private-key identification information, and first certificate identification information with each other, the second correspondence information associating second user identification information, second private-key identification information, and second certificate identification information with each other, the first private key being stored in association with the first private-key identification information, the second private key being stored in association with the second private-key identification information;

an input interface;

a communication interface; and the processor, the set of program instructions which, when executed by the processor, cause the processor to perform a method comprising:

receiving an input designating user identification information via the input interface;

in response to receiving the input designating the first user identification information, identifying the first private-key identification information and the first certificate identification information using the first correspondence information corresponding to the first user identification information;

in response to identifying the first private-key identification information, acquiring the first private key corresponding to the first private-key identification information from the non-volatile storage as a private key;

in response to identifying the first private-key identification information, acquiring a first certificate identified by the first certificate identification information from a specific external device via the communication interface as a certificate, the first certificate including a first public key corresponding to the first private key as a public key, the specific external device being different from the information processing device;

in response to receiving the input designating the second user identification information, identifying the second private-key identification information and the second certificate identification information using the second correspondence information corresponding to the second user identification information;

in response to identifying the second private-key identification information, acquiring the second private key corresponding to the second private-key identification information from the non-volatile storage as the private key;

in response to identifying the second certificate identification information, acquiring a second certificate identified by the second certificate identification information from the specific external device via the communication interface as the certificate, the second certificate including a second public key corresponding to the second private key as the public key;

converting specific data using the acquired private key to generate converted specific data, the converting including one of encrypting the specific data and decrypting the specific data encrypted using the public key included in the acquired certificate; and outputting the acquired certificate.

11. The non-transitory computer readable storage medium according to claim 10, wherein the outputting further outputs the converted specific data after encrypting the specific data.

12. The non-transitory computer readable storage medium according to claim 10, wherein the set of program instructions further comprises:

acquiring data to be signed; and generating the specific data according to the data to be signed, wherein the encrypting encrypts the specific data using the private key to generate signature data as the converted specific data, and wherein the outputting outputs signed data including the data to be signed, the signature data, and the acquired certificate.

13. The non-transitory computer readable storage medium according to claim 12, wherein the outputting transmits the signed data to the specific external device via the communication interface.

14. The non-transitory computer readable storage medium according to claim 10, wherein the first certificate identification information is a first filename given to the first certificate, and the second certificate identification information is a second filename given to the second certificate.

15. The non-transitory computer readable storage medium according to claim 10, wherein the set of program instructions further comprises determining whether the acquired certificate is an authentic certificate corresponding to the acquired private key, and wherein the outputting outputs the acquired certificate in response to determining that the acquired certificate is the authentic certificate.

16. A method for controlling an information processing device including:

a non-volatile storage configured to store a plurality of private keys including a first private key and a second private key and a plurality of sets of correspondence information including first correspondence information and second correspondence information, the first correspondence information associating first user identification information, first private-key identification information, and first certificate identification information with each other, the second correspondence information associating second user identification information, second private-key identification information, and second certificate identification information with each other, the first private key being stored in association with the first private-key identification information, the second private key being stored in association with the second private-key identification information;

an input interface; and a communication interface, the method comprising:

receiving an input designating user identification information via the input interface;

in response to receiving the input designating the first user identification information, identifying the first private-key identification information and the first certificate identification information using the first correspondence information corresponding to the first user identification information;

in response to identifying the first private-key identification information, acquiring the first private key corresponding to the first private-key identification information from the non-volatile storage as a private key;

in response to identifying the first certificate identification information, acquiring a first certificate identified by the first certificate identification information from a specific external device via the communication interface as a certificate, the first certificate including a first public key corresponding to the first private key as a public key, the specific external device being different from the information processing device;

in response to receiving the input designating the second user identification information, identifying the second private-key identification information and the second certificate identification information using the second correspondence information corresponding to the second user identification information;

in response to identifying the second private-key identification information, acquiring the second private key corresponding to the second private-key identification information from the non-volatile storage as the private key; in response to identifying the second certificate identification information, acquiring a second certificate identified by the second certificate identification information from the specific external device via the communication interface as the certificate, the second certificate including a second public key corresponding to the second private key as the public key;

converting specific data using the acquired private key to generate converted specific data, the converting including one of encrypting the specific data and decrypting the specific data encrypted using the public key included in the acquired certificate; and outputting the acquired certificate.

* * * * *